(12) United States Patent
Wang et al.

(10) Patent No.: US 11,660,541 B2
(45) Date of Patent: May 30, 2023

(54) METHODS, APPARATUSES, DEVICES AND STORAGE MEDIA FOR CONTROLLING GAME STATES

(71) Applicant: SENSETIME INTERNATIONAL PTE. LTD., Singapore (SG)

(72) Inventors: Xinxin Wang, Singapore (SG); Fei Xie, Singapore (SG); Shuai Zhang, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 17/364,459

(22) Filed: Jun. 30, 2021

(65) Prior Publication Data

US 2022/0395753 A1 Dec. 15, 2022

Related U.S. Application Data

(63) Continuation of application No. PCT/IB2021/055741, filed on Jun. 28, 2021.

(30) Foreign Application Priority Data

Jun. 14, 2021 (SG) .......................... 10202106346R

(51) Int. Cl.
  *G07F 17/32* (2006.01)
  *A63F 13/69* (2014.01)
  *A63F 13/86* (2014.01)
(52) U.S. Cl.
  CPC ............. *A63F 13/69* (2014.09); *A63F 13/86* (2014.09); *G07F 17/322* (2013.01); *G07F 17/3293* (2013.01)

(58) Field of Classification Search
  None
  See application file for complete search history.

(56) References Cited

U.S. PATENT DOCUMENTS

| | | |
|---|---|---|
| 2010/0331085 A1 | 12/2010 | Nagano |
| 2015/0312517 A1 | 10/2015 | Hoyt et al. |
| 2016/0335837 A1* | 11/2016 | Shigeta ............... G07F 17/3276 |
| 2018/0268648 A1 | 9/2018 | Shiget et al. |
| 2018/0286171 A1 | 10/2018 | Shigeta |

OTHER PUBLICATIONS

PCT International Search Report in International Appln. No. PCT/IB2021/055741, dated Sep. 17, 2021, 3 pages.

(Continued)

*Primary Examiner* — Damon J Pierce
(74) *Attorney, Agent, or Firm* — Fish & Richardson P.C.

(57) ABSTRACT

A method, an apparatus, a devices and a storage medium for controlling game states is provided in the disclosure, wherein the method includes: obtaining a video stream of a game area; performing a detection on the video stream to determine a number of game items and identification information of each of the game items in the game area; in a case that the number of the game items in the game area reaches a first predetermined value, generating a game result according to the number of the game items, the identification information of each of the game items, and a preset game result generation condition; and in response to that the game result is generated, switching the game to a result processing state.

18 Claims, 3 Drawing Sheets

(56) References Cited

OTHER PUBLICATIONS

PCT International Written Opinion in International Appln. No. PCT/IB2021/055741, dated Sep. 17, 2021, 6 pages.
SG Office Action issued in Singapore Appln. No. 10202106346R, dated Sep. 20, 2021, 9 pages.
Notification of Material filed by a third party in Australian Appln. No. 2021204580, dated Mar. 20, 2023, 64 pages.

* cited by examiner

METHODS, APPARATUSES, DEVICES AND STORAGE MEDIA FOR CONTROLLING GAME STATES

CROSS-REFERENCE TO RELATED APPLICATIONS

The present application is a continuation of International Application No. PCT/IB2021/055741 filed on Jun. 28, 2021, which claims priority to Singapore Patent Application No. 10202106346R, filed on Jun. 14, 2021, all of which are incorporated herein by reference in their entirety.

TECHNICAL FIELD

The present disclosure relates to computer vision technology, and in particular, to methods, apparatuses, devices and storage media for controlling game states.

BACKGROUND

Usually, a complete game can be divided into a number of different states, and the game is switched to a corresponding state according to the game progress in the course of the game. At present, game states are controlled by a relevant staff with either doing some specific actions or operating a designated button. This way of switching game states relies on manual operation, wastes manpower and is to be improved in efficiency.

SUMMARY

Methods, apparatuses, devices and storage media for controlling game states are provided in the disclosure.

According to a first aspect of the embodiments of the present disclosure, a method of controlling game states is provided, including: obtaining a video stream of a game area; performing a detection on the video stream to determine the number of game items and identification information of each of the game items in the game area; in a case that the number of the game items in the game area reaches a first predetermined value, generating a game result according to the number of the game items, the identification information of each of the game items, and a preset game result generation condition; and in response to that the game result is generated, switching the game to a result processing state.

In some optional embodiments, determining the number of the game items and the identification information of each of the game items in the game area, includes: in a case that the game is in an item operating state, determining the number of the game items and the identification information of each of the game items in the game area.

In some optional embodiments, further includes: for each of the game items, detecting a state of an identification surface of the game item according to the video stream, where the state of the identification surface includes a visible state or a hidden state; the preset game result generation condition includes that the identification surface of each of the game items is in the visible state, generating the game result according to the number of the game items, the identification information of each of the game items, and the preset game result generation condition, includes: in a case that the identification surface of each of the game items is in the visible state, generating the game result according to the number of the game items, and the identification information of each of the game items.

In some optional embodiments, further includes: detecting an item operating object according to the video stream; and, the preset game result generation condition includes that a distance between each of the game items and the detected item operating object is greater than a preset distance threshold, generating the game result according to the number of the game items, the identification information of each of the game items, and the preset game result generation condition includes: in a case that a distance between each of the game items and the detected item operating object is greater than the preset distance threshold, generating the game result according to the number of the game items, and the identification information of each of the game items.

In some optional embodiments, further includes: detecting location information of each of the game items according to the video stream; and, the preset game result generation condition includes that the location information of each of the game items remains unchanged for a preset period of time, generating the game result according to the number of the game items, the identification information of each of the game items, and the preset game result generation condition, includes: in a case that, the location information of each of the game items remains unchanged for the preset period of time, generating the game result according to the number of the game items, and the identification information of each of the game items.

In some optional embodiments, the preset game result generation condition includes a sub-condition corresponding to the number of the game items, generating the game result according to the number of the game items, the identification information of each of the game items, and the preset game result generation condition, includes: determining whether the identification information of the game items meets the sub-condition which is corresponding to the number of the game items, to obtain a first determination result; and, in response to that the first determination result is yes, generating the game result.

In some optional embodiments, generating the game result according to the number of the game items, the identification information of each of the game items, and the preset game result generation condition, further includes: in response to that the first determination result is no, remaining the game in an item operating state to perform one or more operations on the game items by an item operating object in the game area when the game is in the item operating state.

In some optional embodiments, the preset game result generation condition further includes that the number of the game items in the game area is lower than a second predetermined value, the second predetermined value is greater than the first predetermined value, generating the game result according to the number of the game items, the identification information of each of the game items, and the preset game result generation condition, further includes: in a case that the game is in the item operating state, and the number of the game items is lower than the second predetermined value, in response to detecting that the number of the game items in the game area increases by 1, determining whether the identification information of the game items meets the sub-condition which is corresponding to the number of the game items, to obtain a second determination result; in response to that the second determination result is yes, generating the game result; and, in response to that the second determination result is no, remaining the game in the item operating state.

In some optional embodiments, in response to that the game is switched to the result processing state, displaying the game result in a client.

In some optional embodiments, performing the detection on the video stream further to: determine operation information of one or more operations performed on the game items by an item operating object in the game area; and, in a case that the operation information is determined as indicating abnormal based on preset operation prohibited information, switch the game to a halt state.

In some optional embodiments, obtaining the video stream of the game area includes: obtaining respective video streams which are synchronously captured in the game area from a plurality of viewing angles.

In some optional embodiments, the game items include one or more cards.

According to a second aspect of the embodiments of the present disclosure, an apparatus for controlling game states is provided, includes: a video stream obtaining unit, configured to obtain a video stream of a game area; an item detector, configured to perform a detection on the video stream to determine a number of game items and identification information of each of the game items in the game area; a result generating unit, configured to, in a case that the number of the game items in the game area reaches a first predetermined value, generate a game result according to the number of the game items, the identification information of each of the game items, and a preset game result generation condition; and a state switching unit, configured to, in response to that the game result is generated, switch the game to a result processing state.

In some optional embodiments, for determining the number of the game items and the identification information of each of the game items in the game area, the item detector is configured to, in a case that the game is in an item operating state, determine the number of the game items and the identification information of each of the game items in the game area.

In some optional embodiments, the apparatus further includes an identification surface detector configured to, for each of the game items, detect a state of an identification surface of the game item according to the video stream, where the state of the identification surface includes a visible state or a hidden state; the preset game result generation condition includes that the identification surface of each of the game items is in the visible state; and the result generating unit is configured to, in a case that the identification surface of each of the game items is in the visible state, generate the game result according to the number of the game items, and the identification information of each of the game items.

In some optional embodiments, the apparatus further includes an operating object detector configured to detect an item operating object according to the video stream; the preset game result generation condition includes that a distance between each of the game items and the detected item operating object is greater than a preset distance threshold; and the result generating unit is configured to, in a case that the distance between each of the game items and the detected item operating object is greater than the preset distance threshold, generate the game result according to the number of the game items, and the identification information of each of the game items.

In some optional embodiments, the apparatus further includes a location information detector configured to detect location information of each of the game items according to the video stream; the preset game result generation condition includes that the location information of each of the game items remains unchanged for a preset period of time; and the result generating unit is configured to, in a case that the location information of each of the game items remains unchanged for the preset period of time, generate the game result according to the number of the game items, and the identification information of each of the game items.

In some optional embodiments, the preset game result generation condition includes a sub-condition corresponding to the number of the game items, and the result generating unit is configured to: determine whether the identification information of the game items meets the sub-condition which is corresponding to the number of the game items, to obtain a first determination result; and in response to that the first determination result is yes, generate the game result.

In some optional embodiments, the result generating unit is configured to, in response to that the first determination result is no, remain the game in an item operating state to perform one or more operations on the game items by an item operating object in the game area when the game is in the item operating state.

In some optional embodiments, the preset game result generation condition further includes that the number of the game items in the game area is lower than a second predetermined value greater than the first predetermined value, and the result generating unit includes: a condition determination sub-unit configured to, when the game is in the item operating state and the number of the game items is lower than the second predetermined value, in response to detecting that the number of the game items in the game area increases by 1, determine whether the identification information of the game items meets the sub-condition which is corresponding to the number of the game items, to obtain a second determination result; a result generating sub-unit configured to, in response to that the second determination result is yes, generate the game result; and, a state remaining sub-unit configured to, in response to that the second determination result is no, remain the game in the item operating state.

In some optional embodiments, the apparatus further includes a display unit configured to in response to that the game is switched to the result processing state, display the game result in a client.

In some optional embodiments, the apparatus further includes an operation information detector configured to determine operation information of one or more operations performed on the game item by an item operating object in the game area; and an abnormal halt unit configured to in a case that the operation information is determined as indicating abnormal based on preset operation prohibited information, switch the game to a halt state.

In some optional embodiments, the video stream obtaining unit is configured to obtain respective video streams which are synchronously captured in the game area from a plurality of viewing angles.

In some optional embodiments, the game items include one or more cards.

According to a third aspect of the embodiments of the present disclosure, a computer device is provided, including a memory, a processor and a computer program stored on the memory and executable on the processor, when the computer program is executed by the processor, the method of controlling game states according to any one of the first aspect is implemented.

According to a fourth aspect of the embodiments of the present disclosure, a computer readable storage medium storing a computer program is provided, when the computer program is executed by a processor, the method of controlling game states according to any one of the first aspect is implemented.

According to a fifth aspect of the embodiments of the present disclosure, a computer program product is provided, including a computer program, when the computer program is executed by a processor, the method of controlling game states according to any one of the first aspect is implemented.

According to the embodiment of the present disclosure, by performing a detection on a video stream of a game area and generating a game result according to a number of game items, identification information of each of the game items and a game result generation condition, a game played in the game area can be switched to a result processing state automatically in response to the generated game result. That is, the game can be automatically switched to the result processing state based on the video stream of the game area, which could save labor costs, improve efficiency of switching game states, and facilitate to ensure the normal progress of the game.

It should be understood that the general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
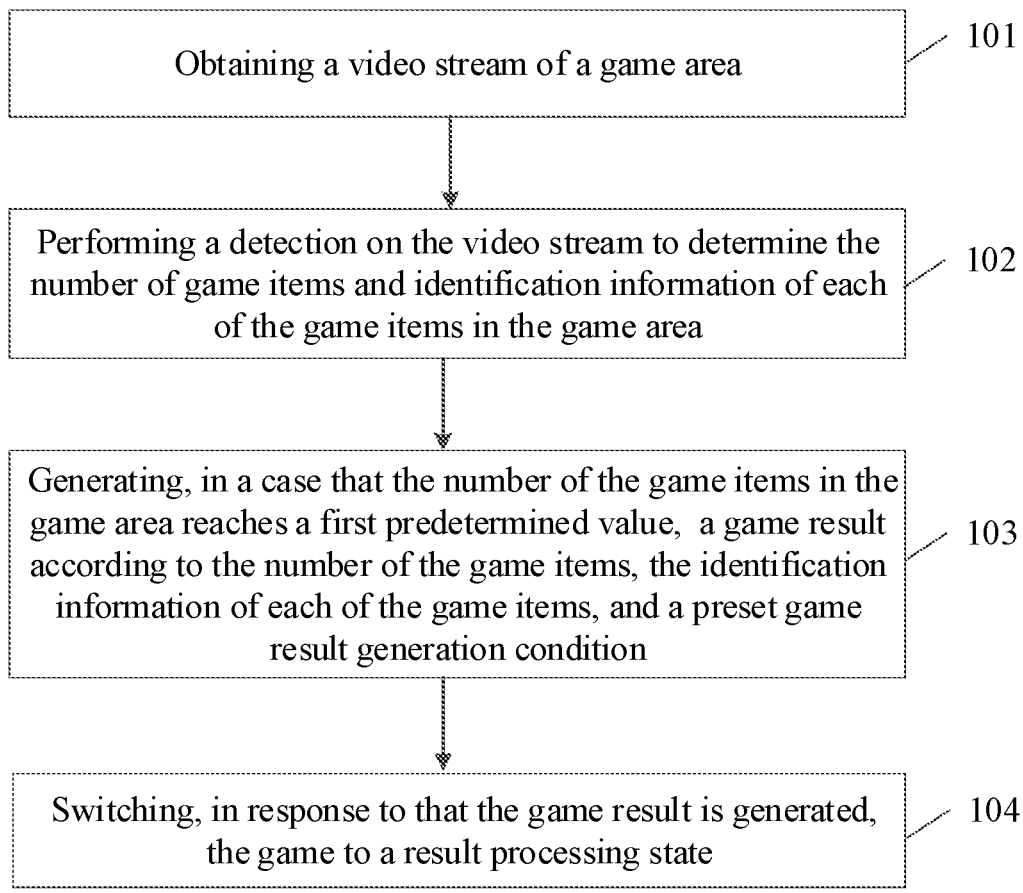
FIG. 1 is a flow chart illustrating a method of controlling game states according to an exemplary embodiment.

Examples will be described in detail herein, with the illustrations thereof represented in the drawings. When the following descriptions involve the drawings, like numerals in different drawings refer to like or similar elements unless otherwise indicated. Rather, they are merely examples of apparatuses and methods consistent with some aspects of the present disclosure as detailed in the appended claims.

The terminology used in the present disclosure is for the purpose of describing particular embodiments only and is not intended to limit the present disclosure. The singular forms 'a', 'said' and 'the' used in the present disclosure and the appended claims are also intended to include the majority of forms unless the context clearly indicates other meanings. It should also be understood that the term 'and/or' as used herein refers to and includes any or all possible combinations of one or more associated listed items.

It should be understood that although terms like first, second, third, etc. may be used to describe various information in this disclosure, the information should not be limited to these terms. These terms are only used to distinguish the same type of information from each other. For example, without departing from the scope of the present disclosure, first information may also be referred to as second information, and similarly, second information may also be referred to as first information. Depending on the context, the word "if" as used herein may be interpreted as "when" or "upon" or "in response to determining".

Usually, a complete game can be divided into a number of different states, and the game is switched to a corresponding state according to the game progress in the course of the game. For example, a tabletop card game can generally be divided into a card dealing state and a result processing state. Specifically, when the game is in the card dealing state, a game dealer can deal cards to players participating in the game. When the cards are dealt, the game can be switched to the result processing state. When the game is in this state, a game result can be determined based on rules of the tabletop card game together with points and suits of the cards, and the like. For example, the player winning the tabletop card game can be determined in the end.

At present, game states are switched by a relevant staff with either doing some specific actions or operating a designated button. Taking the game process of a tabletop card game as an example, if the game is to be switched from the card dealing state to the result processing state when cards are dealt by a game dealer, the game dealer can do specific actions to be recognized by a detection device, thereby triggering the game to be switched from the card dealing state to the result processing state; or the game dealer can operate a physical or virtual button on a client to trigger the game to be switched from the card dealing state to the result processing state. Obviously, this way of controlling game states relies on manual operation, wastes manpower and is to be improved in efficiency.

Based on the above, a method of controlling game states is provided by the embodiment of the present disclosure, where the number of game items and identification information of each of the game items can be automatically detected based on a video stream of a game area, and a game result is generated according to the number of game items and the identification information of each of the game items, and the game is automatically switched to the result processing state when the game result is generated. Based on a detection on the video stream of the game area, automatic switching of the game states can be realized, which saves labor costs, improves efficiency of switching game states, and facilitate to ensure the normal progress of the game.

In order to make the method of controlling game states provided by the present disclosure clearer, implementation process of solutions provided by the present disclosure will be described in detail below with reference to the accompanying drawings and specific embodiments.

Referring to FIG. 1, which is a flow chart illustrating a method of controlling game states according to the embodiments provided by the present disclosure. As shown in FIG. 1, the process includes the following steps.

At step 101, obtaining a video stream of a game area.

In the embodiment of the present disclosure, the game area indicates an area provided for gaming. For example, during a tabletop card game, cards are to be placed in a tabletop area for gaming, and the tabletop area can be taken as the game area. In this step, the video stream of the game area can be obtained, and the way of obtaining the video stream can include a plurality of implementation ways, which is not limited in this embodiment.

In a possible implementation, the video stream of the game area can be obtained through a preset video capture device. For example, a video capture device can be installed above the tabletop area used in the tabletop card game to obtain the video stream of the tabletop area.

At step 102, performing a detection on the video stream to determine the number of game items and identification information of each of the game items in the game area.

In the embodiment of the present disclosure, the game item includes items or props used for determining a game result during the game process. For example, the cards used in a tabletop card game can be used as the game items of the present embodiment. During the tabletop card game, a game dealer is to deal the game items "cards" to players participating in the game and a game result can be determined according to the cards dealt to different players. For example, the player who received the card with the largest points may be determined as winner of the game.

Different game items have different identification information. For example, a card is used as a game item in a tabletop card game, and information such as points, suits, etc. included in the cards that can be used to distinguish the cards, can be used as game identification information in the embodiments of the present disclosure.

In some optional embodiments, one or more game items can be placed in the game area in advance. For example, in the tabletop card game, the game dealer can deal one or more cards in the tabletop area in advance, so as to determine a result of the tabletop card game based on the cards dealt.

When the video stream of the game area is obtained, a detection can be performed on the video stream of the game area in this step to determine the number of game items in the game area, and identification information of each of the game items in the game area. Taking the tabletop card game as an example, a detection can be performed on the video stream of the tabletop area in this step, and the number of cards dealt in the tabletop area, as well as the suits and points of each card dealt in the tabletop area can be determined. For example, in this step, a detection can be performed on the video stream of the tabletop area, and it can be determined that the tabletop area includes 4 cards, and the identification information of the four cards included is: Ace of hearts, 2 of spades, 3 of diamonds, and 4 of clubs.

In order to determine the number of the game items in the game area and the identification information of each of the game items, performing a detection on the video stream of the game area can be implemented in a variety of ways, which is not limited in this embodiment. In a possible implementation, a recognition network used for recognizing a game item involved in a video stream can be acquired based on pre-training a learnable machine learning model or a neural network model, such that the trained recognition network can be used to perform a detection on the video stream when it is to detect the game items in the game area.

In some optional embodiments, determining the number of the game items and the identification information of each of the game items in the game area, includes: in a case that the game is in an item operating state, determining the number of the game items and the identification information of each of the game items in the game area.

In the above-mentioned embodiments, only when the game is in the item operating state, the detection will be performed on the video stream of the game area, and the number of the game items and the identification information of each of the game items in the game area can be determined according to the video stream.

When the game is in the item operating state, an item operating object can perform one or more operations on the game items in the game area. For example, when a tabletop card game is in the item operating state, a game dealer can perform an operation of dealing cards in the tabletop area. When the game dealer deals cards one by one, a detection can be performed on a video stream of the tabletop area in real time to determine the number of cards, and points and suits of each card in the tabletop area.

At step 103, in a case that the number of the game items in the game area reaches a first predetermined value, generating a game result according to the number of the game items, the identification information of each of the game items, and a preset game result generation condition.

In the embodiment of the present disclosure, the first predetermined value can be set in advance as a comparison value of the number of the game items in the game area. The first predetermined value can indicate the minimum value of the number of game items sufficient to generate a game result. Taking a tabletop card game as an example, at least 4 cards are to be dealt to get a game result, and the game result can be determined according to the points and suits of the 4 cards. Then taking this tabletop card game as an example, the first predetermined value can be preset as 4 in the embodiment of the present disclosure.

When the number of the game items in the game area is determined in step 102, whether the number of the game items in the game area reaches the first predetermined value can be further determined in this step, that is, whether the number of the game items in the game area is greater than or equal to the first predetermined value can be determined.

The case that the number of the game items in the game area is greater than or equal to the first predetermined value, indicates that game items for this game reaches a basic number requirement, and a detection logic for the game result can be triggered at this time.

The game result can be generated according to the number of the game items in the game area, the identification information of each of the game items, and the preset game result generation condition in this step. The preset game result generation condition includes a condition for generating a game result according to the number of the game items and the identification information.

Taking a tabletop card game as an example. For example, in the tabletop card game, a first predetermined value can be preset as 4; a preset game result generation condition can include: in a case of 4 dealt cards, the one who received cards with the sum of points closest to 9 wins; in a case of 5 dealt cards, the one who received cards with the largest sum of points wins; in a case of 6 dealt cards, the one who received cards with the sum of points closest to 9 wins. The players participating in the game can choose to place game coins in different areas corresponding to Party A or Party B to participate in the game.

During the game, a game dealer can deal the first card to Party A, the second card to Party B, the third card to Party A, and the fourth card to Party B. At this time, based on a detection performed on the video stream of the tabletop area, it can be determined that the number of cards in the tabletop area reaches the preset first predetermined value: 4, thereby the detection logic for the game result is triggered. That is, the game result generation condition corresponding to 4 cards "in the case of 4 dealt cards, the one who received cards with the sum of points closest to 9 wins" can be further combined to determine the winning one based on the cards dealt to Party A and Party B.

Exemplarily, the first card and the third card dealt to Party A are: 6 of hearts and 3 of diamonds, then the sum of points of Party A received cards is 9; the second card and the fourth card dealt to Party B are: 5 of hearts and 2 of diamonds, then the sum of points of Party B received cards is 7. By combining with the condition corresponding to 4 cards in the game result generation condition "in the case of 4 dealt cards, the one who received cards with the sum of points closest to 9 wins", it can be determined that the sum of points of Party A received cards is closest to 9, that is, Party A wins.

In the above examples, the sum of points of Party A received cards is closer to 9 than the sum of points of Party B received cards, so a game result can be generated according to a corresponding game result generation condition, that is, the winner can be determined as Party A. It should be understood that if the sums of the points of Party A received cards is the same to that of Party B received cards, that is, the sums of the points of Party A received cards and Party B received cards are close to 9 at the same degree, then a game result cannot be generated according to the game result generation condition corresponding to 4 cards. At this time, the game dealer can continue to deal cards, for example, the game dealer can deal the fifth card to Party A. Thus, whether a game result can be generated is determined according to the points of the 5 cards and the game result generation condition corresponding to 5 cards. If a game result cannot be generated, the game dealer can continue to deal the sixth card to Party B, and whether a game result can be generated is further determined according to the points of the 6 cards and the game result generation condition corresponding to the 6 cards.

In some optional embodiments, prior to generating the game result, a state of an identification surface of each game item can be detected according to the video stream, and the state of the identification surface includes a visible state or a hidden state.

In the above-mentioned embodiments, prior to generating the game result according to the number of the game items, the identification information of each of the game items, and the preset game result generation condition, the state of the identification surface of each game item can be detected according to the video stream. The state of the identification surface of a game item can be used to represent that whether identification information of the game item is visible.

For example, the state of the identification surface of a game item can include the visible state in which the identification information of the identification surface of the game item is visible or the hidden state in which the identification information of the identification surface of the game item is invisible. Taking cards in a tabletop card game as an example of the game items, when a front side of a card is facing up, it indicates that the identification surface of the game item is in the visible state; and when a reverse side of a card is facing up, it indicates that the identification surface of the game item is in the hidden state.

In a possible implementation, in a case that the identification surface of each of the game items is in the visible state, the game result is generated according to the number of the game items, and the identification information of each of the game items.

In the above-mentioned implementations, in a case that the identification surface of each of the game items in the tabletop area is in the visible state, the game result is generated according to the number of the game items, the identification information of each of the game items, and the game result generation condition. Still taking the tabletop card game as an example, in the above-mentioned implementations, when the front sides of the cards in the tabletop area are facing up, a game result can be determined according to the number of the cards, suits and points of each of the cards.

Optionally, in a case where the identification surfaces of one or more game items are in the hidden state, a current state of the game can be determined as not meeting the game result generation condition.

In some optional embodiments, prior to generating the game result, detecting an item operating object according to the video stream. The item operating object indicates an object that can operate the game items in the game area. For example, in a tabletop card game, a game dealer who can perform an operation of dealing cards can be taken as the item operating object in this embodiment. In this embodiment, an item operating object can be set in advance, for example, the game dealer can be set as the item operating object in advance.

In the above-mentioned embodiments, the item operating object can be detected according to the video stream of the game area, prior to generating the game result according to the number of the game items, the identification information of each of the game items, and the preset game result generation condition.

In a possible implementation, in a case that a distance between each of the game items and the detected item operating object is greater than a preset distance threshold, generating the game result according to the number of the game items, and the identification information of each of the game items.

The distance between a game item and an item operating object is used to characterize the stability of the game item. For example, in a tabletop card game, the distance between a card and a hand of a game dealer is large enough, indicating that the card is dealt by the game dealer, that is, the card can be determined as stably dealt to the tabletop area only when the hand of the game dealer is far enough away from the card.

In the above-mentioned implementations, the distance between each game item and the item operating object can be further determined when the item operating object is detected according to the video stream. Only when the distance between each game item and the item operating object is greater than the preset distance threshold, the game result can be generated according to the number of game items, and the identification information of the game items.

In the above-mentioned embodiments, the game result is generated in a case where the distance between the game item and the item operating object is sufficiently large. That is, the game items are in a stable state before the game result is generated, thereby improving the accuracy of detection results for identification information of respective game items and the number of game items, further improving the reliability of game states switching operations.

In some optional embodiments, prior to generating the game result, location information of each of the game items can also be detected according to the video stream; and in a case that, the location information of each of the game items remains unchanged for a preset period of time, the game result is generated according to the number of the game items, and the identification information of each of the game items.

The location information of the game items indicates location of each of the game items in the game area. In a tabletop card game, location information of cards in a tabletop area can be determined according to a detection performed a video stream of the tabletop area.

In the above-mentioned embodiments, when the location information of the game items is determined according to the video stream, whether the location information of each of the game items remains unchanged for the preset period of time can be further determined. The preset period of time can be a preset threshold for time length. The location information of a game item remains unchanged for the preset period of time, indicating that the game item is in a sufficiently stable state, and the game item can be used to generate the game result. The location information of a game item changes in the preset period of time, indicating that the game item is in an unstable state, and the game item is not suitable for generating the game result.

For example, in the tabletop card game, location information of each of the cards in the tabletop area can be determined according to the video stream. The location information of each of the cards remains unchanged for the preset period of time, indicating that the cards in the tabletop area are in a stable state. Further, the game result of the tabletop card game can be generated based on the number of the cards and the suits and points of each of the cards.

In the above-mentioned embodiments, only in a case that the location information of each of the game items remains unchanged for the preset period of time, a game result is generated according to the game items. That is, the game items are in a sufficiently stable state before the game result is generated, thereby improving the accuracy for detecting the number and the identification information of the game items, and improving the reliability of game states switching operations.

At step 104, in response to that the game result is generated, switching the game to a result processing state.

When the game result is generated according to the number of the game items, the identification information of each of the game items, and the preset game result generation condition in step 103, in this step, in response to that the game result is generated, the current game can be switched to the result processing state. For example, in the tabletop card game, the game can be switched from the card dealing state to the result processing state in this step.

When the game is in the result processing state, and a game result is generated for the game, each participant participating in the game is not allowed to perform an operation on any items or objects in the game area, and further process can be made according to the game result. For example, game coins of a player who loses the game can be given to a player who wins the game, or, the player who wins the game will be rewarded and the player who loses the game will be punished according to game rules.

In some optional embodiments, further includes: displaying the game result in a client, when the game is switched to the result processing state.

In the embodiment of the present disclosure, by performing the detection on the video stream of the game area and generating the game result according to the number of game items, identification information of each of the game items and the game result generation condition, the game played in the game area can be switched to the result processing state automatically in response to the generated game result. That is, the game can be automatically switched to the result processing state based on the video stream of the game area, which could save labor costs, improve efficiency of switching game states, and facilitate to ensure the normal progress of the game.

In some optional embodiments, in the preset game result generation condition, different numbers of game items correspond to different sub-conditions. A sub-condition corresponding to a certain number defines a rule for generating a game result according to the identification information of each game item in a case of the certain number of game items.

For example, in the tabletop card game, the game result generation condition can be set in advance as: the player with the largest points of card wins. It can be specifically set in the game result generation condition that: the player corresponding to the card with the largest points in 4 cards wins, and the points of the card is greater than or equal to 4; the player corresponding to the card with the largest points in 5 cards wins, and the points of the card is greater than or equal to 5; the player corresponding to the card with the largest points in 6 cards wins, and the points of the card is greater than or equal to 6.

In the above-mentioned embodiments, according to the number of the game items, and a sub-condition corresponding to the number of the game items in the preset game result generation condition, whether the identification information of each of the game items meets a corresponding sub-condition can be determined. In a case that the identification information of each of the game items meets the corresponding sub-condition, the game result can be generated according to the corresponding sub-condition and the identification information of each of the game items.

For example, in a tabletop card game, if the number of cards in the tabletop area is 5, which reaches the first predetermined value of 4. In the above-mentioned embodiments, it can be determined that whether the points of the 5 cards meet the sub-condition corresponding to 5 cards in the game result generation condition "the player corresponding to the card with the largest points in 5 cards wins and the points of the card is greater than or equal to 5". If the card with the largest points in the 5 cards in the tabletop area is 8 of hearts, then it can be determined that the player corresponding to the card with 8 of hearts wins.

In the above-mentioned embodiments, the game result generation condition is subdivided into sub-conditions corresponding to different numbers of the game items. When generating the game result according to the identification information of the game items in the game area, the game result can be generated more accurately according to a specific corresponding sub-condition.

In some optional embodiments, whether the identification information of the game items meets the sub-condition which is corresponding to the number of the game items is determined to obtain a first determination result. In response to that the first determination result is yes, the game result is generated; and in response to that the first determination result is no, the game is remained in an item operating state to perform one or more operations on the game items by an item operating object in the game area when the game is in the item operating state.

The number of the game items in the game area reaches the first predetermined value, which only indicates that the number of the game items in the game area reaches a basic condition for generating a game result, and whether the game result can be generated according to the game items, it is to be further determined based on whether the identification information of the game items meets the sub-condition corresponding to the number of the game items in the game result generation conditions.

If the identification information of each of the game items can meet the sub-condition corresponding to the number of the game items, the game result can be generated according to the identification information of each of the game items. If the identification information of each of the game items cannot meet the sub-condition corresponding to the number of the game items, the game result cannot be generated based on the identification information of the game items in the tabletop area. In the above-mentioned embodiments, in a case where the identification information of each of the game items cannot meet the corresponding sub-condition, the game can be remained in the item operating state. When the game is in the item operating state, an item operating object can perform an operation on the game items in the game area. Exemplarily, when a tabletop card game is in the item operating state, a game dealer can perform an operation of card dealing in the tabletop area.

In the above-mentioned embodiments, in a case that the game result cannot be generated according to the identification information of each of the game items, the game can be remained in the item operating state, such that the item operating object can continue to perform one or more operations on the game items in the game area, and the game can be continued normally.

The number of the game items in the game area reaches the first predetermined value, but the identification information of each of the game items does not meet the corresponding sub-condition, so the game result cannot be generated and the item operating object can continue perform one or more operations on the game items when the game is in the item operating state. In some optional embodiments, during the item operating object continues to perform one or more operations on the game items, the game items in the game area can be continuously detected for determining whether the identification information of each of the game items meets the corresponding sub-condition.

In a possible implementation, the preset game result generation condition further includes that the number of the game items in the game area is lower than a second predetermined value. The second predetermined value can be preset as greater than the first predetermined value. The second predetermined value indicates the maximum value of the number of the game items that can generate a game result in the game area. For example, in a tabletop card game, at least 4 cards are needed to generate a game result, and at most 8 cards are needed. In the above-mentioned implementations, the first predetermined value corresponds to 4 cards, and the second predetermined value corresponds to 8 cards.

Figure 2:
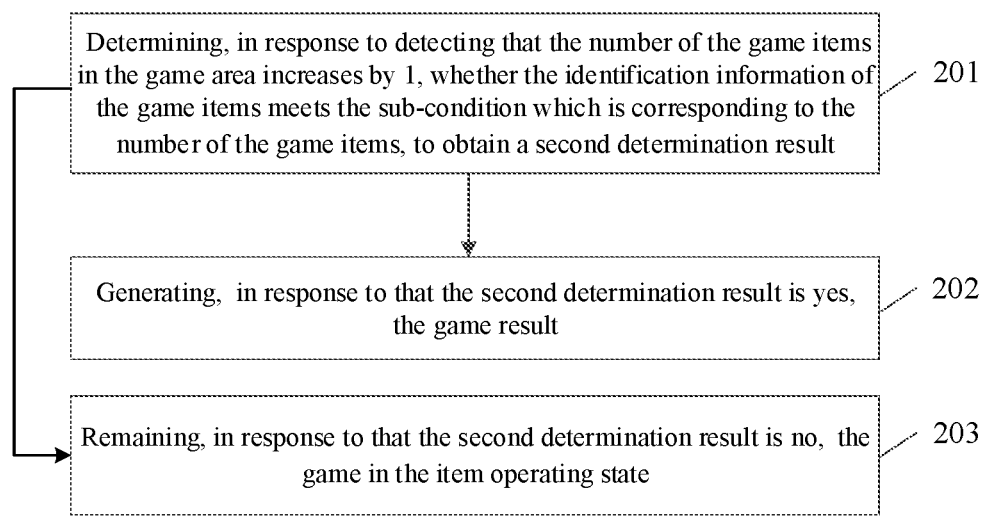
FIG. 2 is a flow chart illustrating a method of detecting game results according to an exemplary embodiment.

Referring to FIG. 2, in a case that the number of the game items in the game area is lower than the second predetermined value, the process of continuing to detect the game items in the game area can include the following repeated operations.

At step 201, in response to detecting that the number of the game items in the game area increases by 1, determining whether the identification information of the game items meets the sub-condition which is corresponding to the number of the game items, to obtain a second determination result.

When the game is in the item operating state, the item operating object can perform one or more operations on the game items in the game area. For example, in a tabletop card game, if the game result cannot be generated according to 4 cards in the tabletop area, the game dealer can continue to deal the fifth card when the game is in the item operating state.

In this step, in response to that the number of the cards is increased from 4 to 5, it can be determined whether the identification information such as the points, suits, etc. of the cards in the tabletop area meets the sub-condition corresponding to 5 cards in the game result generation condition.

It should be understood that every time the number of the game items in the game area increases by 1 on the basis of the first predetermined value, the detection process of this step will be triggered, until the number of the game items in the game area reaches the second predetermined value. For example, when the number of cards in the tabletop area increases from 5 to 6, the detection process of this step can be triggered; and when the number of cards in the tabletop area increase from 6 to 7, the detection process of this step can be triggered.

At step 202, in response to that the second determination result is yes, generating the game result.

Every time the number of the game items in the game area increases by 1, the identification information of the game items correspondingly increases, and the corresponding sub-condition in the game result generation conditions changes as well. Therefore, when a game item is added to the game area, it may be able to generate the game result based on the identification information and the corresponding sub-condition.

In response to the identification information of each of the game items meets the corresponding sub-condition, the game result can be generated in this step. For example, in a tabletop card game, when the cards in the tabletop area increase from 4 to 5, the sub-condition corresponding to 5 cards can be determined according to the points and suits of the 5 cards, so that a corresponding game result can be generated.

At step 203, in response to that the second determination result is no, remaining the game in the item operating state.

Every time the number of the game items in the game area increases by 1, the identification information of the game items correspondingly increases, and the corresponding sub-condition in the game result generation conditions changes as well. Therefore, when a game item is added to the game area, it may be able to generate the game result based on the identification information and the corresponding sub-condition; or, the game result still cannot be generated based on the identification information and the corresponding sub-condition.

In this step, the game can be remained in the item operating state in response to that the identification information of each of the game items fails to meet the corresponding sub-condition.

The execution steps of the embodiment of the present disclosure will be described by taking a tabletop card game as an example. For example, in the tabletop card game, the first predetermined value can be set as 4 cards in advance; the second predetermined value can be set as 8 cards in advance; the preset game result generation condition includes the following sub-conditions: in a case of 4 dealt cards, the player who received cards with a sum of points closest to 9 wins; in a case of 5 dealt cards, the player who received cards with the largest sum of points wins; in a case of 6 dealt cards, the player who received cards with the sum of points closest to 9 wins; in a case of 7 dealt cards, the player who received cards with the largest sum of points wins; and in a case of 8 dealt cards, the player who received cards with the sum of points closest to 9 wins. A player participating in the game can choose to place a game coin in different areas corresponding to Party A or Party B to participate in the game.

During the game, a game dealer can deal the first card to Party A, the second card to Party B, the third card to Party A, and the fourth card to Party B. Based on a detection on the video stream of the tabletop area, and the cards dealt to Party A and Party B, it is determined that the corresponding sub-condition in the game result generation conditions is not met, and the game is remained in the item operating state. The game dealer continues to deal the cards: deals the fifth card to Party A.

In the embodiment of the present disclosure, in response to that the number of cards in the table area is increased from 4 to 5, the step 201 is triggered to execute, that is, further determining whether the identification information such as the points, etc. of the 5 cards in the tabletop area meets the sub-condition corresponding to 5 cards in the game result generation condition "in the case of 5 dealt cards, the player who received cards with the largest sum of points wins".

If the points of the 5 cards in the tabletop area can meet the sub-condition corresponding to 5 cards in the game result generation condition, then the winning one can be determined based on the points of the 5 cards in step 202.

For example, the first, third, and fifth cards dealt to Party A are: 4 of hearts, 3 of diamonds, 2 of clubs, then a sum of the points of Party A received cards is 9; the second and fourth cards dealt to Party B are: 3 of hearts and 2 of diamonds, then a sum of the points of Party B received cards is 5. Combining with the condition corresponding to 5 cards in the game result generation condition "in the case of 5 dealt cards, the player who received card with the largest sum of points wins", the sum of the points of Party A received cards can be determined as the largest, that is, Party A wins.

If the points of the 5 cards in the tabletop area do not meet the sub-condition corresponding to 5 cards in the game result generation condition, the game can be remained in the item operating state in step 203, so that the game dealer can continue to deal the sixth card: dealing the sixth card to Party B.

For example, the first, third, and fifth cards dealt to Party A are: 4 of hearts, 3 of diamonds, 2 of clubs, then a sum of the points of Party A received cards is 9; the second and fourth cards dealt to Party B are: 5 of hearts and 4 of diamonds, then a sum of the points of Party B received cards is 9. Combining the condition corresponding to 5 cards in the game result generation condition "in the case of 5 dealt cards, the player who received card with the largest sum of points wins", and since the sums of points of cards for both players are equal, the corresponding sub-condition is not met. At this time, the tabletop card game remains in the item operating state, so that the game dealer continues to deal cards, for example, dealing the sixth card to Party B.

It should be understood that in the case of dealing the sixth card by the game dealer, the execution process of the steps in the embodiment of the present disclosure is similar to that described in the above-mentioned embodiment, and will not be repeated here. The steps of the embodiment of the present disclosure are executed repeatedly, until the game result of the present game is generated, or until the number of the game items in the game area reaches the second predetermined value. In the tabletop card game, on the basis that the number of cards in the tabletop area indicates the first predetermined value, the detection for the game result can be triggered by adding a card each time. This method can more accurately and timely detect the game result of the tabletop card game.

Figure 3:
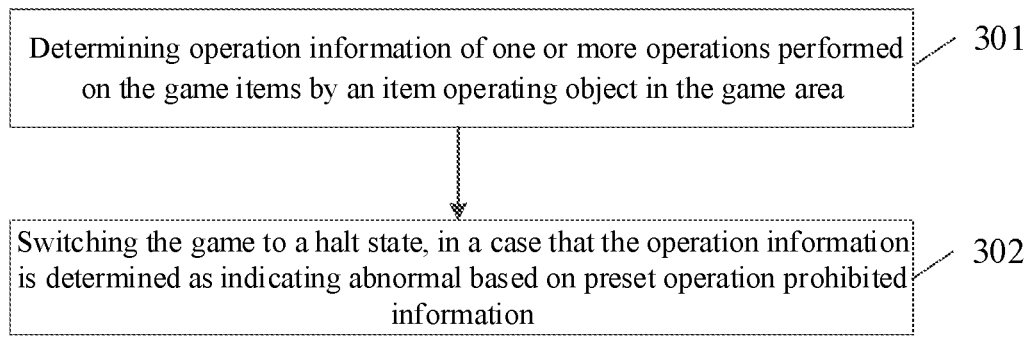
FIG. 3 is a flow chart illustrating a method of detecting operation information according to an exemplary embodiment.

In some optional embodiments, when the video stream of the game area is obtained, as shown in FIG. 3, the following steps may be further included.

At step 301, determining operation information of one or more operations performed on the game items by an item operating object in the game area.

Prior to switching the game to the result processing state, that is, prior to generating the game result, the item operating object usually performs one or more operations on the game items in the game area. The item operating object includes an object that can perform an operation on the game items during the game. For example, in a tabletop card game, in a case that the cards are used as the game items, a game dealer can be taken as the item operating object of this embodiment.

In the embodiment of the present disclosure, when the video stream of the game area is obtained, the operations performed on the game items by the item operating object in the game area can be detected to obtain the operation information of the operations performed on the game items by the item operating object in the game area.

The operation information includes information of any process in which the item operating object performs the operations on the game items in the game area. Exemplary, the operation information can include: the item operating object places the first game item to a first sub-area in a tabletop area; then, the item operating object places the second game item to a second sub-area in the tabletop area. Taking an operation of dealing cards performed by a game dealer as an example, the operation information acquired in this step can include: the game dealer deals the first card to a Party A' area in the tabletop area, the second card to a Party B' area in the tabletop area, the third card to Party A' area in the tabletop area and the fourth card to Party B' area in the tabletop area.

At step 302, in a case that the operation information is determined as indicating abnormal based on preset operation prohibited information, switching the game to a halt state.

When the game is in the item operating state, in the process of performing one or more operations on the game items, the item operating object usually complies with certain operation rules. In the above-mentioned embodiments, the information used to standardize the process of performing one or more operations on the game items by the item operating object is called operation prohibited information. For example, taking the tabletop card game as an example, the game dealer served as the item operating object is to deal cards to a prescribed position according to a certain dealing order.

In this step, whether the operation information of one or more operations performed on the game items by the item operating object indicates abnormal can be determined based on preset operation prohibited information. Taking the tabletop card game as an example, dealing rules for the game dealer to deal cards can be set in advance. When the game is in the item operating state, for the game dealer dealing cards, whether the process of dealing cards indicates abnormal can be determined based on the preset operation prohibited information in the above-mentioned embodiments.

The specific implementation of determining that whether the operation information indicates abnormal based on the preset operation prohibited information is not limited in the embodiment of the present disclosure. In a possible implementation, in an algorithm layer, the operation information of the operations performed on the game items by the item operating object in the game area can be recognized, and the operation information can be compared with a service logic set by a service logic layer to determine whether the operation information indicates abnormal. In a case that the operation information indicates abnormal, the game can be switched to the halt state. The game is in the halt state indicates that the game cannot be continued normally, and abnormal behaviors generated during the game should be dealt with.

For example, when a first sub-area and a second sub-area is pre-divided from the tabletop area, dealing order of the game dealer can be set based on the operation prohibited information as: the first card is dealt to the first sub-area; the second card is dealt to the second sub-area; the third card is dealt to the first sub-area; the fourth card is dealt to the second sub-area. In this step, whether the operation information indicates abnormal can be determined based on the detected operation information of one or more operations of cards dealing performed on the cards by the game dealer in the tabletop area, and the dealing order of the game dealer in the preset operation prohibited information. For example, if the game dealer deals the third card to the second sub-area, then the operation information indicates abnormal, and the game can be switched to the halt state at this time.

In the above-mentioned embodiments, the operation performed on the game items by the item operating object in the game area can be automatically detected based on the video stream, and the game can be switched to the halt state in time when the operation of the item operating object indicates abnormal. In this method the abnormal operation of the item operating object can be detected in time, and the game can be suspended to deal with the abnormal in time, so as to ensure the standardization and fairness of the game process, and ensure the normal progress of the game.

In some possible embodiments, obtaining the video stream of the game area includes: obtaining respective video streams which are synchronously captured in the game area from a plurality of viewing angles, the plurality of viewing angles includes at least one side viewing angle and at least one top viewing angle, the at least one side viewing angle includes a left side viewing angle and/or a right side viewing angle.

In the above embodiments, the video stream of the game area can be synchronously captured from a plurality of viewing angles. For example, a video capture device can be set directly above the game area, to obtain a video stream of the game area from a top viewing angle. Optionally, a video capture device can also be set on the upper side of the game area, to capture a video stream of the game area from the upper side in a bird's eye view synchronously. For example, a camera can be set on the diagonally upside of tabletop area to capture a video stream of the game area synchronously.

In the above embodiments, the video stream of the game area can be synchronously captured from a plurality of viewing angles, such that a detection can be performed on the game area according to the captured video stream. In this way, a more comprehensive video stream of the game area can be obtained, a more accurate detection of the game area can be realized, switching of game states can be realized, the game result can be determined more accurately, and facilitate to ensure the normal progress of the game.

Figure 4:
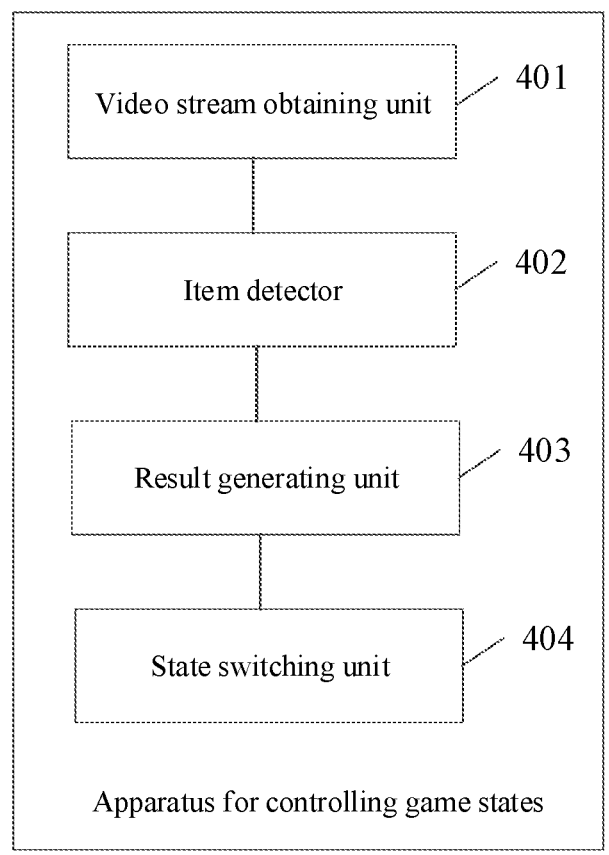
FIG. 4 is a schematic diagram illustrating an apparatus for controlling game states according to an exemplary embodiment.

As shown in FIG. 4, the present disclosure provides an apparatus for controlling game states, which can execute the method of controlling game states according to any embodiment of the present disclosure. The apparatus can include a video stream obtaining unit 401, an item detector 402, a result generating unit 403, and a state switching unit 404. The video stream obtaining unit 401, configured to obtain a video stream of a game area; the item detector 402, configured to perform a detection on the video stream to determine a number of game items and identification information of each of the game items in the game area; the result generating unit 403, configured to, in a case that the number of the game items in the game area reaches a first predetermined value, generate a game result according to the number of the game items, the identification information of each of the game items, and a preset game result generation condition; and the state switching unit 404, configured to, in response to that the game result is generated, switch the game to a result processing state.

Optionally, for determining the number of the game items and the identification information of each of the game items in the game area, the item detector 402 is configured to, in a case that the game is in an item operating state, determine the number of the game items and the identification information of each of the game items in the game area.

Figure 5:
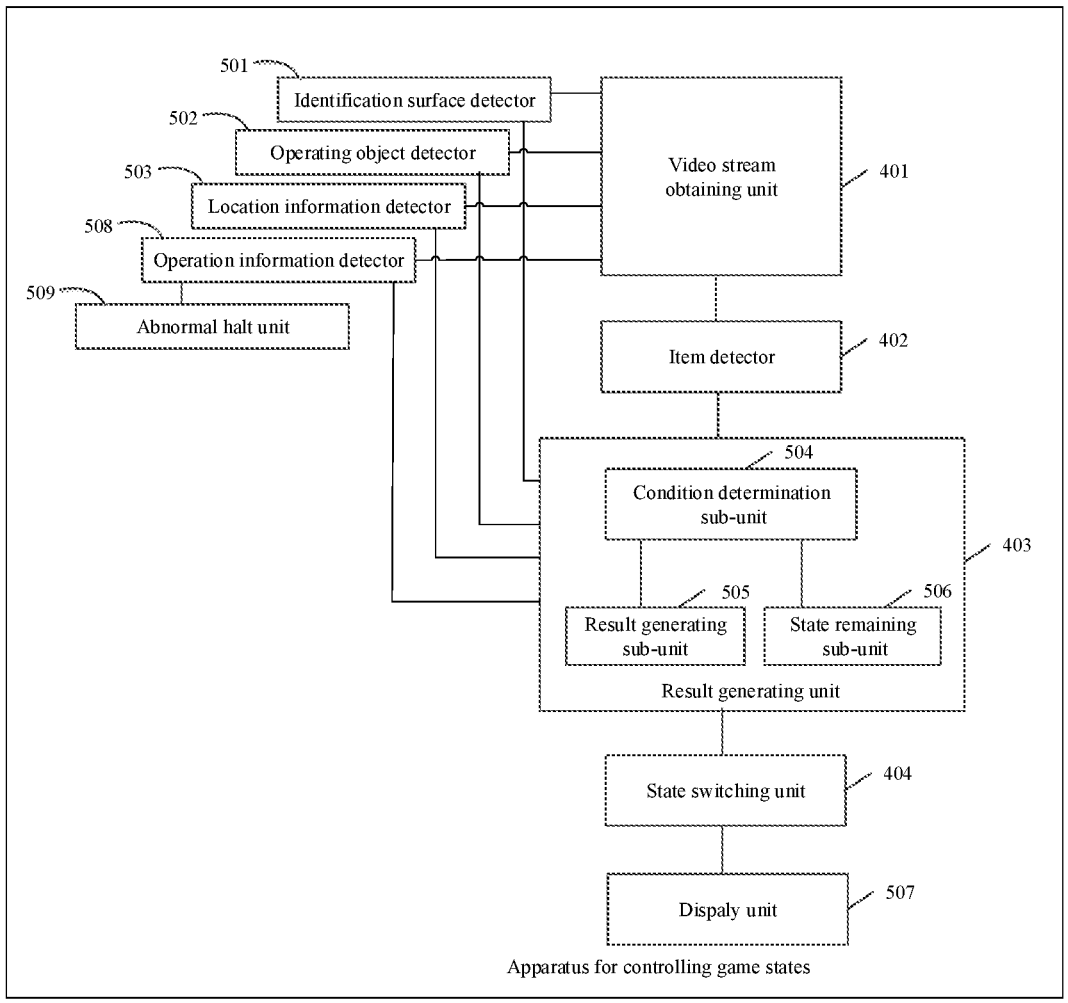
FIG. 5 is a schematic diagram illustrating another apparatus for controlling game states according to an exemplary embodiment.

Optionally, as shown in FIG. 5, the apparatus further includes: an identification surface detector 501 configured to, for each of the game items, detect a state of an identification surface of the game item according to the video stream, where the state of the identification surface includes a visible state or a hidden state; and, the preset game result generation condition includes that the identification surface of each of the game items is in the visible state; and the result generating unit 403 is configured to, in a case that the identification surface of each of the game items is in the visible state, generate the game result according to the number of the game items, and the identification information of each of the game items.

Optionally, as shown in FIG. 5, the apparatus further includes: an operating object detector 502 configured to detect an item operating object according to the video stream; and, the preset game result generation condition includes that a distance between each of the game items and the detected item operating object is greater than a preset distance threshold; and the result generating unit 403 is configured to, in a case that the distance between each of the game items and the detected item operating object is greater than the preset distance threshold, generate the game result according to the number of the game items, and the identification information of each of the game items.

Optionally, as shown in FIG. 5, the apparatus further includes: a location information detector 503 configured to detect location information of each of the game items according to the video stream; and, the preset game result generation condition includes that the location information of each of the game items remains unchanged for a preset period of time; and the result generating unit 403 is configured to, in a case that, the location information of each of the game items remains unchanged for the preset period of time, generate the game result according to the number of the game items, and the identification information of each of the game items.

Optionally, the preset game result generation condition includes a sub-condition corresponding to the number of the game items, and the result generating unit 403 is configured to determine whether the identification information of the game items meets the sub-condition which is corresponding to the number of the game items, to obtain a first determination result; and in response to that the first determination result is yes, generate the game result.

Optionally, the result generating unit 403 is configured to, in response to that first determination result is no, remain the game in an item operating state to perform one or more operations on the game items by an item operating object in the game area when the game is in the item operating state.

Optionally, the preset game result generation condition further includes that the number of the game items in the game area is lower than a second predetermined value greater than the first predetermined value; as shown in FIG. 5, the result generating unit 403 includes: a condition determination sub-unit 504 configured to, when the game is in the item operating state and the number of the game items is lower than the second predetermined value, in response to detecting that the number of the game items in the game area increases by 1, determine whether the identification information of the game items meets the sub-condition which is corresponding to the number of the game items, to obtain a second determination result; a result generating sub-unit 505 configured to in response to that the second determination result is yes, generate the game result; and, a state remaining sub-unit 506 configured to in response to that the second determination result is no, remain the game in the item operating state.

Optionally, as shown in FIG. 5, the apparatus further includes a display unit 507, configured to in response to that the game is switched to the result processing state, display the game result in a client.

Optionally, as shown in FIG. 5, the apparatus further includes an operation information detector 508 configured to determine operation information of one or more operations performed on the game item by an item operating object in the game area; and, an abnormal halt unit 509 configured to in a case that the operation information is determined as indicating abnormal based on preset operation prohibited information, switch the game to a halt state.

Optionally, the video stream obtaining unit 401 is configured to obtain respective video streams which are synchronously captured in the game area from a plurality of viewing angles.

Optionally, the game items include one or more cards.

As for the apparatus embodiment, since it substantially corresponds to the method embodiment, relevant parts can be referred to the description of the method embodiment. The apparatus embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of at least one embodiment of the present disclosure. Those of ordinary skill in the art can understand and implement it without creative labor.

The disclosure further provides a computer device, which includes a memory, a processor and a computer program stored on the memory and executable on the processor, when the computer program is executed by a processor, the method of controlling game states according to any one of the embodiments of the disclosure can be implemented.

Figure 6:
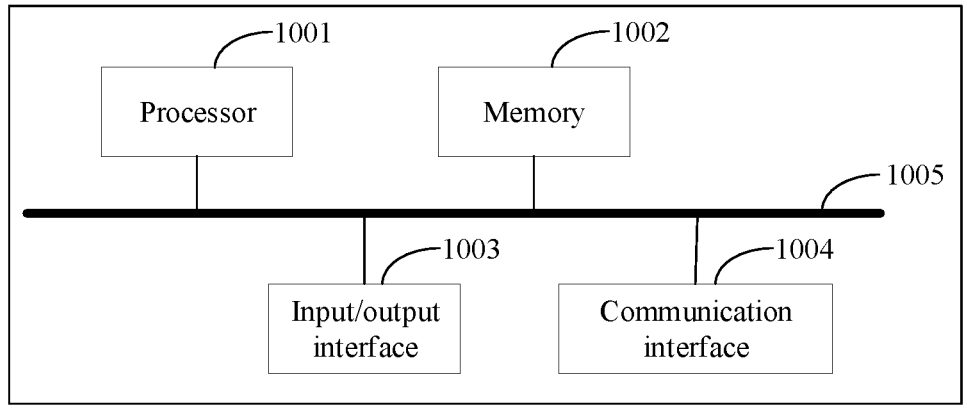
FIG. 6 is a structure schematic diagram illustrating a computer device according to an exemplary embodiment.

FIG. 6 shows a more specific hardware structure diagram of a computer device provided by an embodiment of the present disclosure, and the device may include a processor 1010, a memory 1020, an input/output interface 1030, a communication interface 1040, and a bus 1050. The processor 1010, the memory 1020, the input/output interface 1030, and the communication interface 1040 implement a communication connection between each other inside the device through the bus 1050.

The processor 1010 may be implemented by using a common central processing unit (CPU), a microprocessor, an Application specific integrated circuit (ASIC), or one or more integrated circuits, etc., for executing relevant programs to implement the technical solutions provided by the embodiments of the present description.

The memory 1020 may be implemented in the form of a read only memory (ROM), a random access memory (RAM), a static storage device, a dynamic storage device, and the like. The memory 1020 may store an operating system and other application programs. When the technical solutions provided in the embodiments of the present specification are implemented through software or firmware, related program codes are stored in the memory 1020 and are invoked and executed by the processor 1010.

The input/output interface 1030 is used to connect an input/output module to realize information input and output. The input/output/module can be configured in the device as a component (not shown in the figure), or it can be connected to the device to provide corresponding functions. The input device may include a keyboard, a mouse, a touch screen, a microphone, various sensors, etc., and an output device may include a display, a speaker, a vibrator, an indicator light, and the like.

The communication interface 1040 is used to connect a communication module (not shown in the figure) to implement communication interaction between the device and other devices. The communication module can realize communication through wired means (such as USB, network cable, etc.), or through wireless means (such as mobile network, WIFI, Bluetooth, etc.).

The bus 1050 includes a path to transmit information between various components of the device (for example, the processor 1010, the memory 1020, the input/output interface 1030, and the communication interface 1040).

It should be noted that although the above device only shows the processor 1010, the memory 1020, the input/output interface 1030, the communication interface 1040, and the bus 1050, in the specific implementation process, the device may also include other necessary components for normal operation. In addition, those skilled in the art can understand that the above-mentioned device may also include only the components necessary to implement the solutions of the embodiments of the present specification, and not necessarily include all the components shown in the figures.

The present disclosure further provides a computer readable storage medium having a computer program stored thereon, when the program is executed by a processor, the method of controlling game states according to any one of the embodiments of the disclosure can be implemented.

The non-transitory computer readable storage medium may be ROM, random access memory (RAM), CD-ROM, magnetic tape, floppy disk, optical data storage device, etc., which is not limited in the present disclosure.

In some optional embodiments, a computer program product is provided by the embodiment of the present disclosure, which includes computer readable code, when the computer-readable code is running on a device, the processor in the device executes a method of controlling game states provided by any one of the embodiments. The computer program product can be implemented specific by hardware, software or a combination thereof.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that programmable not disclosure in the present disclosure. The specification and examples are considered as exemplary only, with a true scope and spirit of the present disclosure being indicated by the following claims.

It should be understood that the present disclosure is not limited to the precise structure described above and shown in the accompanying drawings, and that various modifications and changes can be made without departing from the scope thereof. The scope of the present disclosure is limited only by the appended claims.

The above are only preferred examples of the present disclosure, and are not used to limit the present disclosure. Any modification, equivalent replacement, improvement within the spirit and principle of the present disclosure shall be included in the protection scope of the present disclosure.

The invention claimed is:

1. A method of controlling game states, the method comprising:
   obtaining a video stream of a game area of a game;
   detecting an item operating object according to the video stream;
   performing a detection on the video stream to determine a number of game items and identification information of each of the game items in the game area;
   in response to determining that the number of the game items in the game area reaches a first predetermined value, generating a game result according to the number of the game items, the identification information of each of the game items, and a preset game result generation condition, wherein the preset game result generation condition comprises a distance between each of the game items and the detected item operating object being greater than a preset distance threshold; and
   in response to determining that the game result is generated, switching the game to a result processing state,
   wherein generating the game result according to the number of the game items, the identification information of each of the game items, and the preset game result generation condition comprises:
      in response to determining that the distance between each of the game items and the detected item operating object is greater than the preset distance threshold, generating the game result according to the number of the game items and the identification information of each of the game items.

2. The method according to claim 1, wherein determining the number of the game items and the identification information of each of the game items in the game area comprises:
   in response to determining that the game is in an item operating state, determining the number of the game items and the identification information of each of the game items in the game area.

3. The method according to claim 1, further comprising:
   for each of the game items, detecting a state of an identification surface of the game item according to the video stream, wherein the state of the identification surface comprises a visible state or a hidden state,
   wherein the preset game result generation condition comprises the identification surface of each of the game items being in the visible state, and
   wherein generating the game result according to the number of the game items, the identification information of each of the game items, and the preset game result generation condition comprises:
      in response to determining that the identification surface of each of the game items is in the visible state, generating the game result according to the number of the game items and the identification information of each of the game items.

4. The method according to claim 1, further comprising:
   detecting location information of each of the game items according to the video stream,
   wherein the preset game result generation condition comprises the location information of each of the game items remaining unchanged for a preset period of time, and
   wherein generating the game result according to the number of the game items, the identification information of each of the game items, and the preset game result generation condition comprises:
      in response to determining that the location information of each of the game items remains unchanged for the preset period of time, generating the game result according to the number of the game items and the identification information of each of the game items.

5. The method according to claim 1, wherein the preset game result generation condition comprises a sub-condition corresponding to the number of the game items, and
   wherein generating the game result according to the number of the game items, the identification information of each of the game items, and the preset game result generation condition comprises:
      determining whether the identification information of the game items meets the sub-condition corresponding to the number of the game items to obtain a first determination result; and
      generating the game result based on the first determination result.

6. The method according to claim 5, wherein the method comprises:
   in response to determining that the first determination result is yes, generating the game result, or
   in response to determining that the first determination result is no, remaining the game in an item operating state to perform one or more operations on the game items by the item operating object in the game area when the game is in the item operating state.

7. The method according to claim 6, wherein the preset game result generation condition further comprises the number of the game items in the game area being lower than a second predetermined value that is greater than the first predetermined value,
   wherein the method comprises:
      in response to determining that the game is in the item operating state and the number of the game items is lower than the second predetermined value, and in response to detecting that the number of the game items in the game area increases by 1, determining whether the identification information of the game items meets the sub-condition which is corresponding to the number of the game items, to obtain a second determination result; and
      in response to determining that the second determination result is yes, generating the game result; or in response to determining that the second determination result is no, remaining the game in the item operating state.

8. The method according to claim 1, further comprising:
in response to determining that the game is switched to the result processing state, displaying the game result in a client.

9. The method according to claim 1, further comprising:
performing the detection on the video stream to:
determine operation information of one or more operations performed on the game items by the item operating object in the game area; and
in response to determining that the operation information is determined as indicating abnormal based on preset operation prohibited information, switch the game to a halt state.

10. The method according to claim 1, wherein obtaining the video stream of the game area comprises:
obtaining respective video streams which are synchronously captured in the game area from a plurality of viewing angles.

11. The method according to claim 1, the game items comprise one or more cards.

12. A computer device, comprising:
at least one processor; and
one or more memories coupled to the at least one processor and storing programming instructions for execution by the at least one processor to perform operations for controlling game states, the operations comprising:
obtaining a video stream of a game area of a game;
detecting an item operating object according to the video stream
performing a detection on the video stream to determine a number of game items and identification information of each of the game items in the game area;
in response to determining that the number of the game items in the game area reaches a first predetermined value, generating a game result according to the number of the game items, the identification information of each of the game items, and a preset game result generation condition, wherein the preset game result generation condition comprises a distance between each of the game items and the detected item operating object is greater than a preset distance threshold; and
in response to determining that the game result is generated, switching the game to a result processing state;
wherein generating the game result according to the number of the game items, the identification information of each of the game items, and the preset game result generation condition, comprises:
in response to determining that the distance between each of the game items and the detected item operating object is greater than the preset distance threshold, generating the game result according to the number of the game items and the identification information of each of the game items.

13. The computer device according to claim 12, wherein determining the number of the game items and the identification information of each of the game items in the game area comprises:
in response to determining that the game is in an item operating state, determining the number of the game items and the identification information of each of the game items in the game area.

14. The computer device according to claim 12, wherein the operations further comprise:
for each of the game items, detecting a state of an identification surface of the game item according to the video stream, wherein the state of the identification surface comprises a visible state or a hidden state,
wherein the preset game result generation condition comprises the identification surface of each of the game items being in the visible state, and
wherein generating the game result according to the number of the game items, the identification information of each of the game items, and the preset game result generation condition comprises:
in response to determining that the identification surface of each of the game items is in the visible state, generating the game result according to the number of the game items, and the identification information of each of the game items.

15. The computer device according to claim 12, wherein the operations further comprise:
detecting location information of each of the game items according to the video stream,
wherein the preset game result generation condition comprises the location information of each of the game items remaining unchanged for a preset period of time, and
wherein generating the game result according to the number of the game items, the identification information of each of the game items, and the preset game result generation condition comprises:
in response to determining that, the location information of each of the game items remaining unchanged for the preset period of time, generating the game result according to the number of the game items, and the identification information of each of the game items.

16. The computer device according to claim 12, wherein the preset game result generation condition comprises a sub-condition corresponding to the number of the game items,
wherein the operations comprise:
determining whether the identification information of the game items meets the sub-condition corresponding to the number of the game items to obtain a first determination result; and
in response to that the first determination result is yes, generating the game result.

17. The computer device according to claim 16, wherein the operations further comprise:
in response to determining that the first determination result is no, remaining the game in an item operating state to perform one or more operations on the game items by the item operating object in the game area when the game is in the item operating state.

18. A computer readable storage medium, coupled to at least one processor and storing programming instructions for execution by the at least one processor, wherein the programming instructions instruct the at least one processor to perform operations for controlling game states, the operations comprising:
obtaining a video stream of a game area of a game;
detecting an item operating object according to the video stream;
performing a detection on the video stream to determine a number of game items and identification information of each of the game items in the game area;
in response to determining that the number of the game items in the game area reaches a first predetermined value, generating a game result according to the number of the game items, the identification information of each of the game items, and a preset game result generation condition, wherein the preset game result generation condition comprises a distance between each of the game items and the detected item operating object being greater than a preset distance threshold; and in response to determining that the game result is generated, switching the game to a result processing state, wherein generating the game result according to the number of the game items, the identification information of each of the game items, and the preset game result generation condition comprises:
 in response to determining that the distance between each of the game items and the detected item operating object is greater than the preset distance threshold, generating the game result according to the number of the game items, and the identification information of each of the game items.

* * * * *